US011131332B2

(12) United States Patent
Huang et al.

(10) Patent No.: US 11,131,332 B2
(45) Date of Patent: Sep. 28, 2021

(54) CLAMP

(71) Applicant: SYNCMOLD ENTERPRISE CORP., New Taipei (TW)

(72) Inventors: Chun-Hao Huang, New Taipei (TW); Chien-Cheng Yeh, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 105 days.

(21) Appl. No.: 16/592,148

(22) Filed: Oct. 3, 2019

(65) Prior Publication Data
US 2020/0248865 A1 Aug. 6, 2020

Related U.S. Application Data

(60) Provisional application No. 62/800,068, filed on Feb. 1, 2019.

(30) Foreign Application Priority Data

Jun. 3, 2019 (TW) .................. 108207028

(51) Int. Cl.
F16B 2/06 (2006.01)
F16M 11/20 (2006.01)
F16M 13/02 (2006.01)
F16B 2/10 (2006.01)
F16B 2/12 (2006.01)

(52) U.S. Cl.
CPC ................ F16B 2/065 (2013.01); F16B 2/10 (2013.01); F16B 2/12 (2013.01); F16M 11/20 (2013.01); F16M 13/022 (2013.01)

(58) Field of Classification Search
CPC ...... F16B 2/065; F16B 2/12; A47B 2097/006; F16M 13/022; F16M 11/20
See application file for complete search history.

(56) References Cited

U.S. PATENT DOCUMENTS 4,468,803 A * 8/1984 Ronci .................... F16M 11/08
378/167
5,180,220 A * 1/1993 Van Kalsbeek ....... F21V 21/088
362/253

(Continued)

FOREIGN PATENT DOCUMENTS

TW M369599 U 11/2009

Primary Examiner — Eret C McNichols
(74) Attorney, Agent, or Firm — Muncy, Geissler, Olds & Lowe, P.C.

(57) ABSTRACT

A clamp for clamping on a board is provided. The clamp includes a main body, a moving module and a screw rod. The main body includes a housing and a pressing plate to collaboratively define a moving space. The moving module includes a clamping member, a first plate and a second plate connecting with the first plate. The first plate and the pressing plate are disposed in the moving space in parallel. The second plate outwardly extends from the main body. The clamping member is selectively secured to the second plate. The screw rod rotatably and non-shiftably penetrates through the housing and the pressing plate and partially extends outwards the housing, and has threads for fastening to the screw hole of the first plate. When the screw rod rotates, the first plate moves in the moving space, and simultaneously drives the clamping member to move to adjust the distance to the pressing plate.

10 Claims, 8 Drawing Sheets

(56) References Cited

U.S. PATENT DOCUMENTS

| | | | | |
|---|---|---|---|---|
| 5,370,570 A | * | 12/1994 | Harris | A63H 33/006 24/486 |
| 5,842,671 A | * | 12/1998 | Gibbs | A47K 1/09 248/231.41 |
| 5,975,472 A | * | 11/1999 | Hung | F16M 11/105 248/278.1 |
| 6,299,117 B1 | * | 10/2001 | Lin | F16M 13/022 24/135 R |
| 6,394,403 B1 | * | 5/2002 | Hung | F16M 11/10 248/276.1 |
| 6,478,275 B1 | * | 11/2002 | Huang | F16M 11/08 248/278.1 |
| 6,672,553 B1 | * | 1/2004 | Lin | F16M 11/08 248/276.1 |
| 7,121,516 B1 | * | 10/2006 | Koh | A47B 17/033 248/226.11 |
| 7,195,215 B2 | * | 3/2007 | Lin | F16M 11/2014 248/125.9 |
| 7,823,520 B2 | * | 11/2010 | Mayben | A47B 17/033 108/129 |
| 8,141,836 B2 | * | 3/2012 | Saez | F16M 13/02 248/317 |
| 8,162,271 B2 | * | 4/2012 | Li | F16M 11/105 248/162.1 |
| 9,804,652 B2 | * | 10/2017 | Volek | G06F 1/1632 |
| 9,873,244 B1 | * | 1/2018 | Jurman | B41F 15/36 |
| 10,323,791 B1 | * | 6/2019 | Liu | F16B 2/065 |
| 10,571,071 B2 | * | 2/2020 | Hung | F16M 13/02 |
| 10,578,242 B2 | * | 3/2020 | Hung | F16M 11/20 |
| 2007/0040084 A1 | * | 2/2007 | Sturman | F16M 11/041 248/280.11 |
| 2007/0075198 A1 | * | 4/2007 | Foser | E04C 2/428 248/226.11 |
| 2010/0148020 A1 | * | 6/2010 | Wills | F16M 11/24 248/121 |
| 2010/0327129 A1 | * | 12/2010 | Chen | F16M 11/2092 248/121 |
| 2012/0267497 A1 | * | 10/2012 | Bowman | F16M 11/2014 248/280.11 |
| 2013/0075564 A1 | * | 3/2013 | Ho | F16B 2/12 248/316.4 |
| 2013/0075565 A1 | * | 3/2013 | Ho | F16B 2/12 248/316.4 |
| 2014/0367137 A1 | * | 12/2014 | Leung | F16M 11/2014 174/68.3 |
| 2015/0050077 A1 | * | 2/2015 | Huang | F16M 11/041 403/322.1 |
| 2016/0348835 A1 | * | 12/2016 | Blalock | F16M 13/04 |
| 2018/0209582 A1 | * | 7/2018 | Petts | F16M 11/2064 |
| 2018/0316307 A1 | * | 11/2018 | Martin | F24S 25/636 |
| 2018/0344025 A1 | * | 12/2018 | Corbo | F16M 13/022 |

* cited by examiner

CLAMP

CROSS REFERENCE TO RELATED APPLICATION

This application claims the benefit of U.S. Provisional Application Ser. No. 62/800,068 filed on Feb. 1, 2019, and the benefit of Taiwan Patent Application Serial No. 108207028 filed on Jun. 3, 2019. The entirety of each Application is incorporated herein by reference.

BACKGROUND OF THE INVENTION

1. Field of the Invention

The present invention is related to a clamp, more particularly, to a clamp clamping onto a board and being disposed with a supporting arm.

2. Description of Related Art

Taiwan Patent No. M369599 discloses a conventional supporting arm having a clamp, clamped to the edge of a table for supporting a display. The clamp has a U-shaped clamping seat, a screw rod and a clamping piece. One end of the screw rod for connecting to the clamping piece is disposed through the U-shaped clamping seat. When the clamp is clamping on the edge of the table, the clamping piece contacts with the lower surface of the edge of the table, the screw rod protrudes under the edge of the table, and the clamping force of the clamp to the edge of the table may be adjusted by rotating the screw rod.

However, the screw rod of the conventional clamp protrudes under the edge of the table. It is not only inaesthetic but also a potential hazard of collision injury because it is located under the edge of the table. Further, it is inconvenient for the user to operate under the table.

SUMMARY OF THE INVENTION

The main object of the present invention is to hide threads of the clamp within itself. The clamp of the present invention is detachable. The initial spacing of the two clamping tongues of the clamp may be pre-adjusted according to various thicknesses of work surfaces. This initial spacing shortens the threads travel required during the clamping process. The screw rod to be operated by the user is arranged on top of the clamp, such that the operating and adjusting are more convenient. Further, the threads are hidden inside the main body of the clamp and the overall volume is smaller. Hence the visual appeal and operating safety are both taken into considerations.

To achieve the aforementioned objects, the present invention provides a clamp being configured with a supporting arm for supporting a display device and being disposed on a board. The board has an upper surface. The clamp includes a main body, a moving module, and a screw rod. The main body includes a housing and a pressing plate secured with each other. The housing and the pressing plate collaboratively define a moving space. The pressing plate has a shaft hole and detachably covers the upper surface of the board. The moving module has a first plate, a second plate and a clamping member. The first plate includes a screw hole and is disposed in the moving space parallel to the pressing plate. The second plate is attached to the first plate and extends outwardly from the main body. The clamping member is selectively secured to the second plate. The screw rod rotatably and non-shiftably penetrates the housing and the pressing plate, and partially extends outwards the housing, and has threads to fasten to the screw hole of the first plate. When the screw rod rotates, the first plate moves between a highest position and a lowest position in the moving space, and simultaneously drives the second plate and the clamping member to move to adjust the distance between the clamping member and the pressing plate.

In one embodiment, when the first plate is at the lowest position, the distance between the clamping member and the pressing plate is defined as an initial distance, and the initial distance is adjusted by selectively locating the clamping member at different positions of the second plate, wherein the initial distance is greater than a thickness of the board.

A distance between the highest position and the lowest position is defined as a stroke. When the first plate is at the lowest position and the board is between the pressing plate and the clamping member, a clamping distance is formed between the board and the clamping member and is shorter than the stroke.

The screw rod further includes a thinner rod body and a circlip. The pressing plate further includes a main plate. The circlip clips on the thinner rod body and is adjacent to the main plate, such that the thinner rod body is rotatably disposed in the shaft hole of the pressing plate.

The moving module has a compensation angle. When the first plate is at the lowest position, the first plate and second plate define a complementary angle of the compensation angle. When the clamp is clamping on the board, the angle between the first plate and second plate is substantially 90 degrees, wherein the compensation angle is 1 to 10 degrees.

The second plate includes at least one limiting hole, the clamping member includes a locking plate and at least one fixing member. The fixing member penetrates through the locking plate to selectively connect to the at least one limiting hole, such that the clamping member is fastened to the second plate.

The clamping member further includes at least one through hole formed on the locking plate for the fixing member penetrating therethrough.

The through hole of the clamping member is an elongated hole. When the fixing member is fastened in the through hole, the position of the clamping member in relation to the second plate may be adjusted, such that the initial distance between the clamping member and the pressing plate may be fine-tuned.

The clamping member further includes an abutting plate. The abutting plate and the locking plate are integrally formed and substantially have an L-shaped cross-section collectively.

The pressing plate further includes a first pad, and the clamping member further includes a second pad. The first pad and the second pad contact with the board when the clamp is clamping on the board.

The main body further includes a supporting column being fixed to the pressing plate and extending through the housing for receiving the supporting arm.

DETAILED DESCRIPTION OF THE PREFERRED EMBODIMENT

Figure 1:
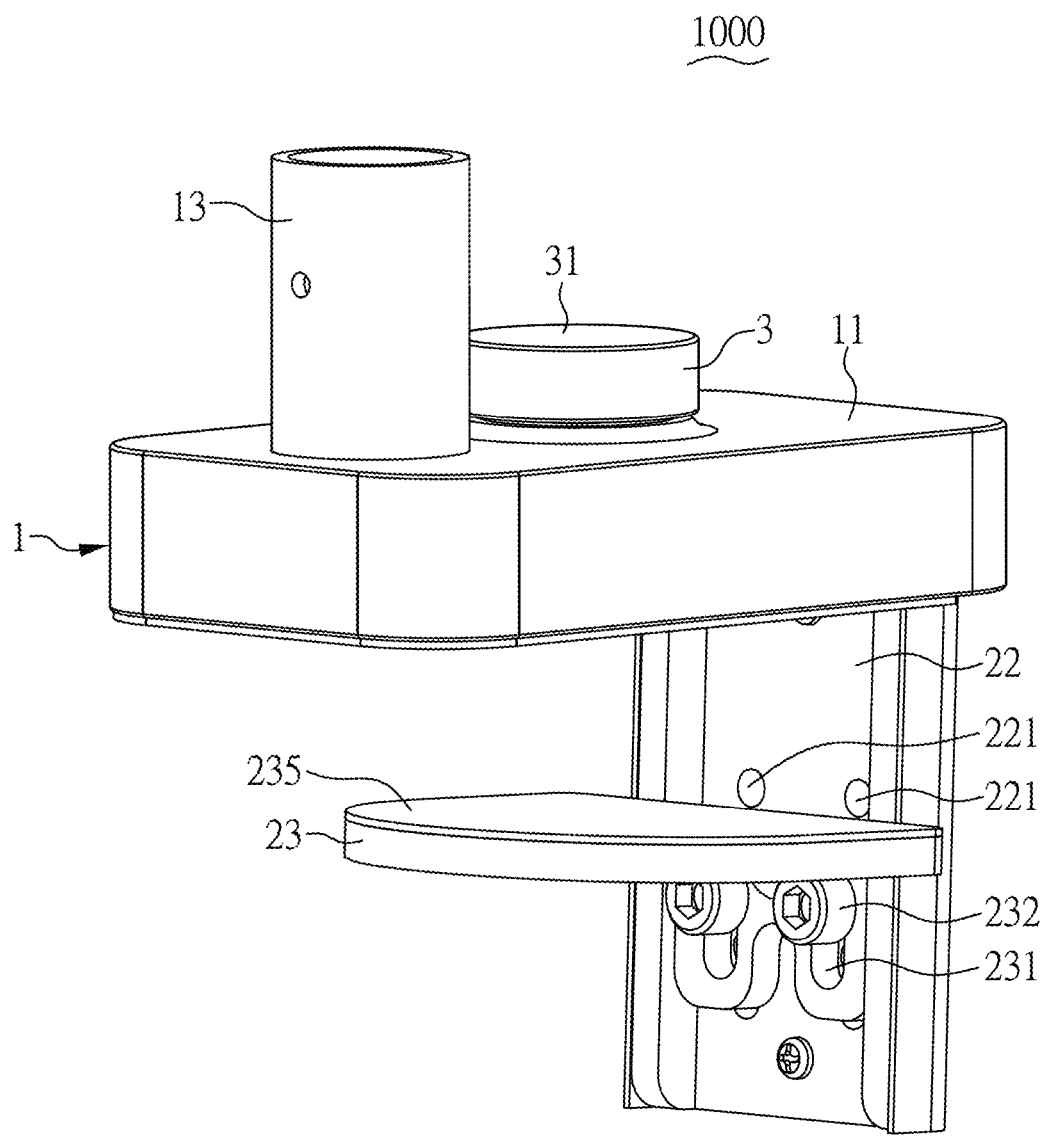
FIG. 1 is a perspective view of the clamp according to an embodiment of the present invention.
Figure 2:
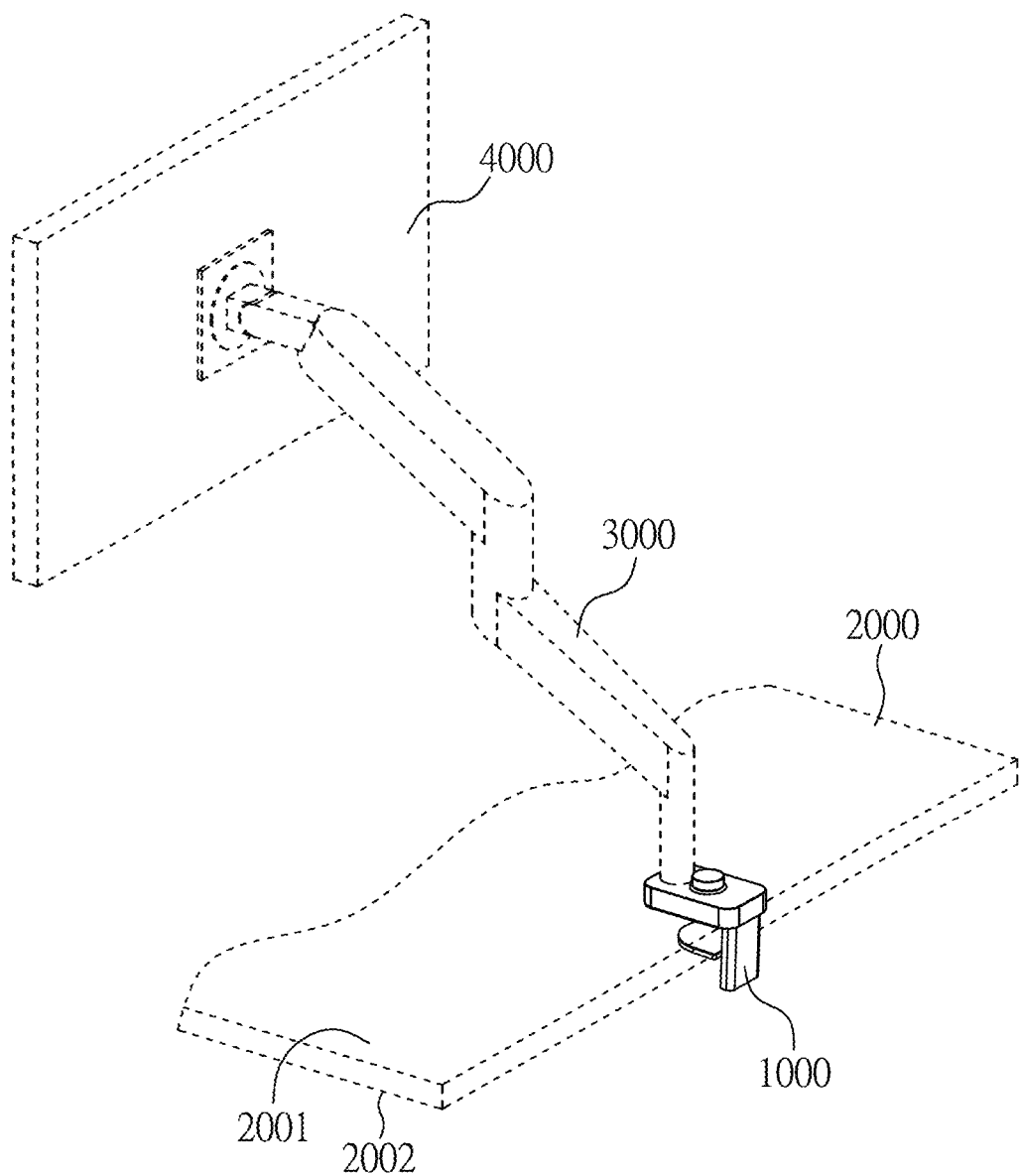
FIG. 2 is a perspective view of actual use scenario of the clamp according to the embodiment of the present invention.

FIGS. 1, 2, 3 and 6 illustrate a perspective view, an actual use scenario, an exploded view, and a cross-sectional view of an embodiment of the clamp 1000 according to the present invention. The clamp 1000 is utilized to clamp on a board 2000, such as a tabletop, for receiving a supporting arm 3000 that supports a display device 4000. The board 2000 includes an upper surface 2001 and a lower surface 2002. The clamp 1000 has a main body 1, a moving module 2, and a screw rod 3. When the clamp 1000 is clamping on the board 2000, the main body 1 and the screw rod 3 are above the upper surface 2001, and the moving module 2 may move in relation to the board 2000.

The main body 1 includes a housing 11, a pressing plate 12, a supporting column 13 and four screws 14. The housing 11 is a hollow cover that is fastened to the pressing plate 12 by the screws 14. The housing 11 and the pressing plate 12 collaboratively define a moving space 15. The pressing plate 12 includes a main plate 121 and a shaft hole 122, which is formed on the main plate 121. The supporting column 13 is secured to the pressing plate 12 and extends away from the upper surface 2001 of the board 2000 through the moving space 15 and the housing 11 for receiving the supporting arm 3000 to be mounted thereon.

Figure 4:
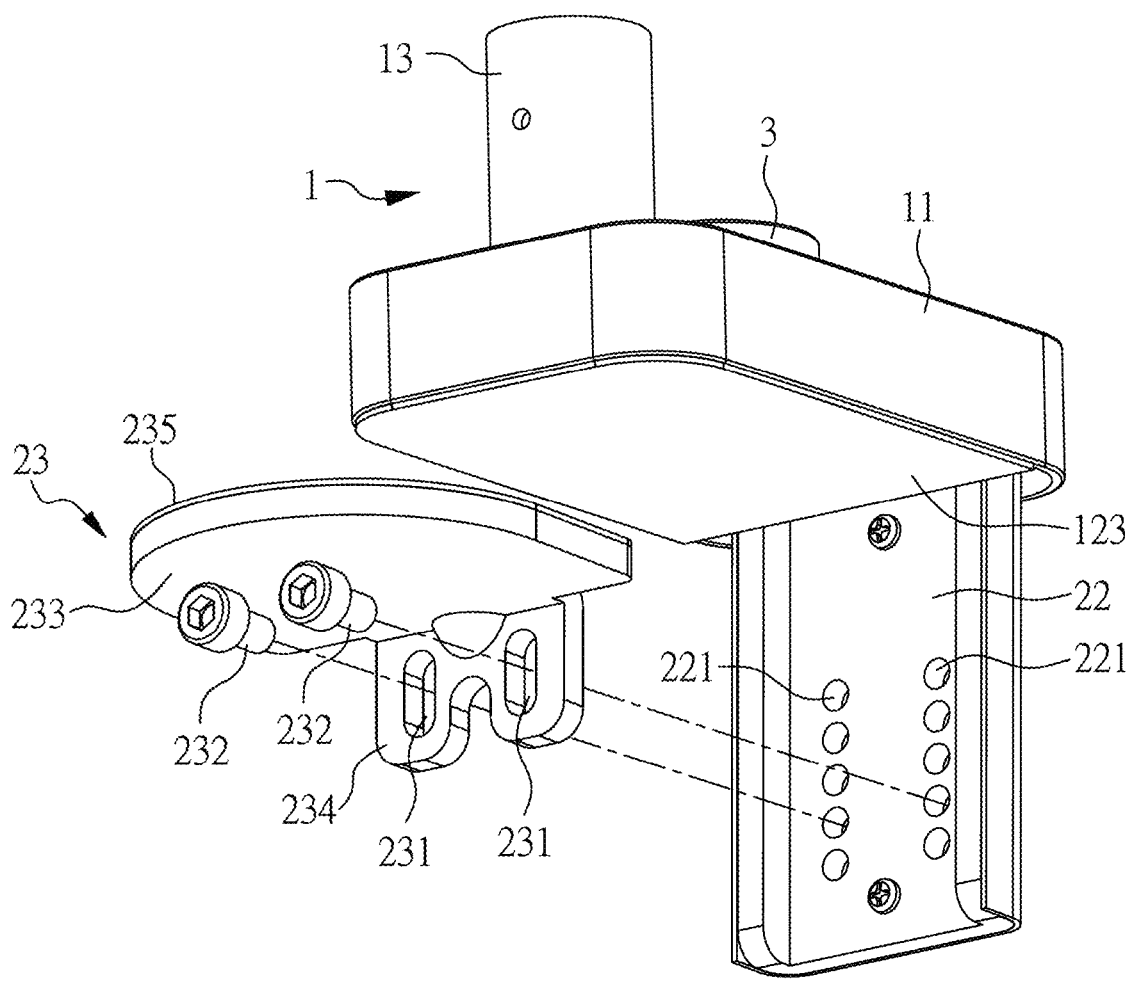
FIG. 4 is a partial perspective exploded view of the clamp according to the embodiment present invention.
Figure 5:
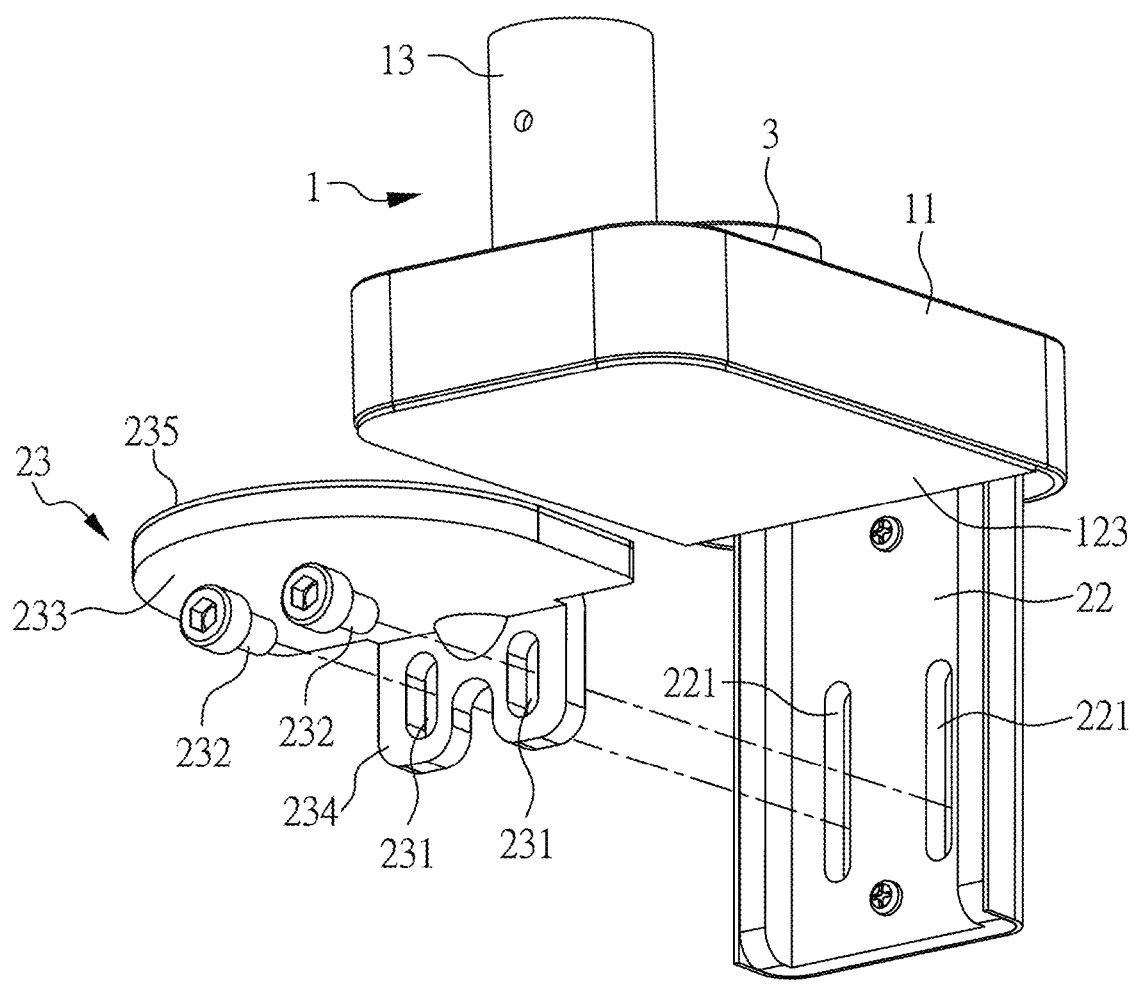
FIG. 5 is a partial perspective exploded view of the clamp according to another embodiment of the present invention.

The moving module 2 includes a first plate 21, a second plate 22, and a clamping member 23. The first plate 21 is connected to and substantially perpendicular to the second plate 22. In this embodiment, the first plate 21 and the second plate 22 are integrally formed. The first plate 21 and the pressing plate 12 are disposed in the moving space 15 and are parallel to each other. The second plate 22 extends outward from the moving space 15 of the main body 1, and the clamping member 23 is selectively secured to the second plate 22. To be more detailed, as shown in FIG. 4, the second plate 22 has a plurality of limiting holes 221, and the clamping member 23 has two through holes 231, two fixing members 232, an abutting plate 233 and a locking plate 234. The abutting plate 233 and the locking plate 234 are integrally formed and have an L-shaped cross-section collectively. The abutting plate 233 is substantially parallel to the lower surface 2002 of the board 2000, and may selectively abut against the lower surface 2002. The locking plate 234 abuts the second plate 22, and the through holes 231 are formed on the locking plate 234. After the fixing members 232 penetrate the through holes 231, depending on the actual thickness of the board 2000, the fixing members 232 are selectively connecting to the limiting holes 221. The clamping member 23 is fastened to the second plate 22. In other embodiments, as shown in FIG. 5, the second plate 22 includes limiting holes 221 corresponding to the through holes 231 respectively. Preferably, the limiting hole 221 is an elongated hole. The details of selection according to the actual thickness of the board 2000 will be described hereinafter.

The through hole 231 of the clamping member 23 is an elongated hole. When the fixing member 232 is fastened in the through hole 231, the distance between the pressing plate 12 and the abutting plate 233 may be further fine-tuned by changing the relative position between the fixing member 232 and the abutting plate 233.

The screw rod 3 sequentially penetrates through the housing 11, the first plate 21, and the pressing plate 12, and includes a head 31, a thicker rod body 32 extending from the head 31, a thinner rod body 33 connected to the thicker rod body 32 and distant from the head 31, and a circlip 34. The head 31 is externally adjacent to the housing 11. The thicker rod body 32 penetrates the housing 11 and has threads 321 for being fastened to the screw hole 122 of the first plate 12. The thinner rod body 33 does not have threads and rotatably passes through a shaft hole 122 formed on the pressing plate 12. The circlip 34 is disposed adjacent to the main plate 121 of the pressing plate 12 and clipped on a groove 331 of the thinner rod body 33 to ensure that the screw rod 3 does not dislocate in relation to the housing 11 while rotating. In other words, the screw rod 3 is rotatable but not shiftable in relation to the housing 11 and pressing plate 12. In this embodiment, the circlip 34 is an E-circlip.

When the screw rod 3 rotates, no relative movement (upward or downward) occurs since there is no matching threads between the screw rod 3 and the housing 11 and between the screw rod 3 and the pressing plate 12. However, the threads 321 of the thicker rod body 32 and the screw hole 211 of the first plate 21 match to each other, such that the first plate 21, which is parallel to pressing plate 12, moves between a lowest position and a highest position in the moving space 15 to simultaneously drive the clamping member 23 to move. The distance between the clamping member 23 and the pressing plate 12 is hence adjusted.

Figure 6:
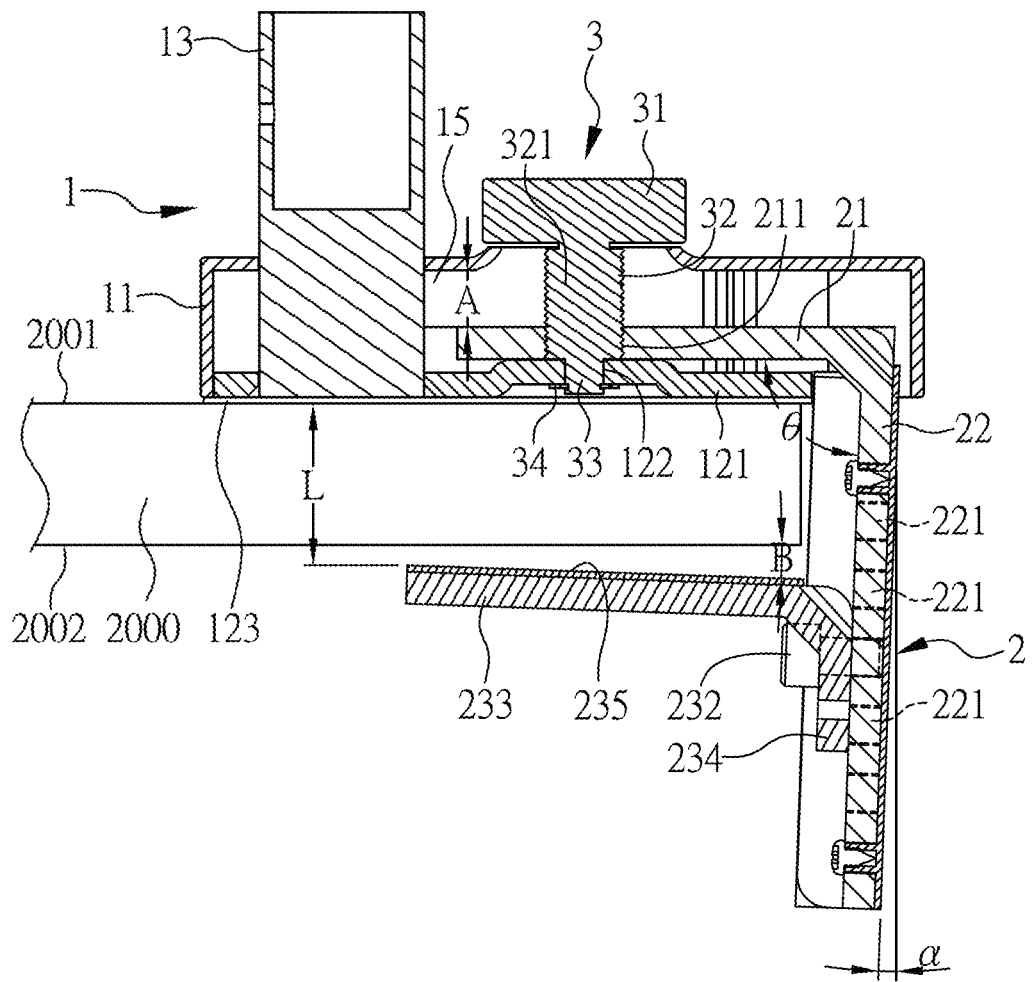
FIG. 6 is a cross-sectional view illustrating the lowest position of the clamp according to an embodiment of the present invention.
Figure 8:
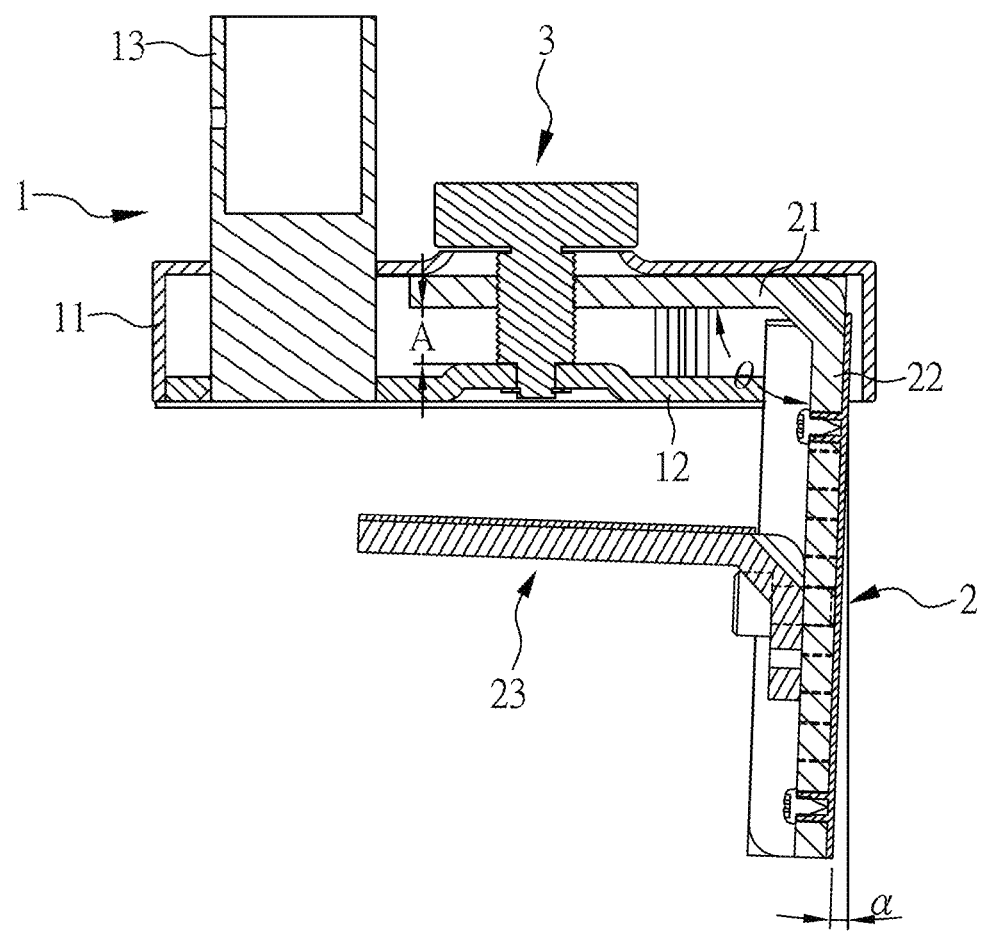
FIG. 8 is a cross-sectional view illustrating the movement of at the highest position of the clamp according to an embodiment of the present invention.

FIGS. 6 and 8 illustrate cross-sectional views of the moving module 2 at the lowest position and the highest position, respectively. The distance between the lowest position and the highest position defines a stroke A. The stroke A depends on the thickness of the pressing plate 12, the thickness of the first plate 21, and the distance between the pressing plate 12 and the housing 11.

FIG. 6 illustrates that the first plate 21 is at the lowest position, the clamping member 23 is fastened to the second plate 22, and the board 2000 is disposed between the pressing plate 12 and the clamping member 23. The shortest distance between the abutting plate 233 and pressing plate 12 is defined as an initial distance L. The longest distance between the board 2000 and the abutting plate 233 is defined as a clamping distance B. The initial distance L is adjusted by selectively attaching the fixing member 232 to the limiting holes 221 at different heights of the second plate 22, and further fine-tuned through changing the relative position of the elongated through hole 231 of the clamping member 23 and the fixing member 232.

When a user intends to attach the clamp 1000 to the board 2000, the first plate 21 may be returned to the lowest position, and the limiting hole 221 corresponding to the fixing member 232 is changed, such that the initial distance L is greater than the thickness of the board member 2000. The clamp 1000 may hence receive the board 2000 between the pressing plate 12 and the clamping member 23.

It should be noted that when changing the limiting hole 221 corresponding to the fixing member 232, not only the initial distance L has to be adjusted to be greater than the thickness of the board 2000 but also the clamping distance B between the board 2000 and the clamping member 23 has to be shorter than the stroke A. The screw rod 3 is then rotated to move the abutting plate 233 of the clamping member 23 to properly attach underneath the board 2000, so that the clamp 1000 firmly clamps the board 2000.

Figure 3:
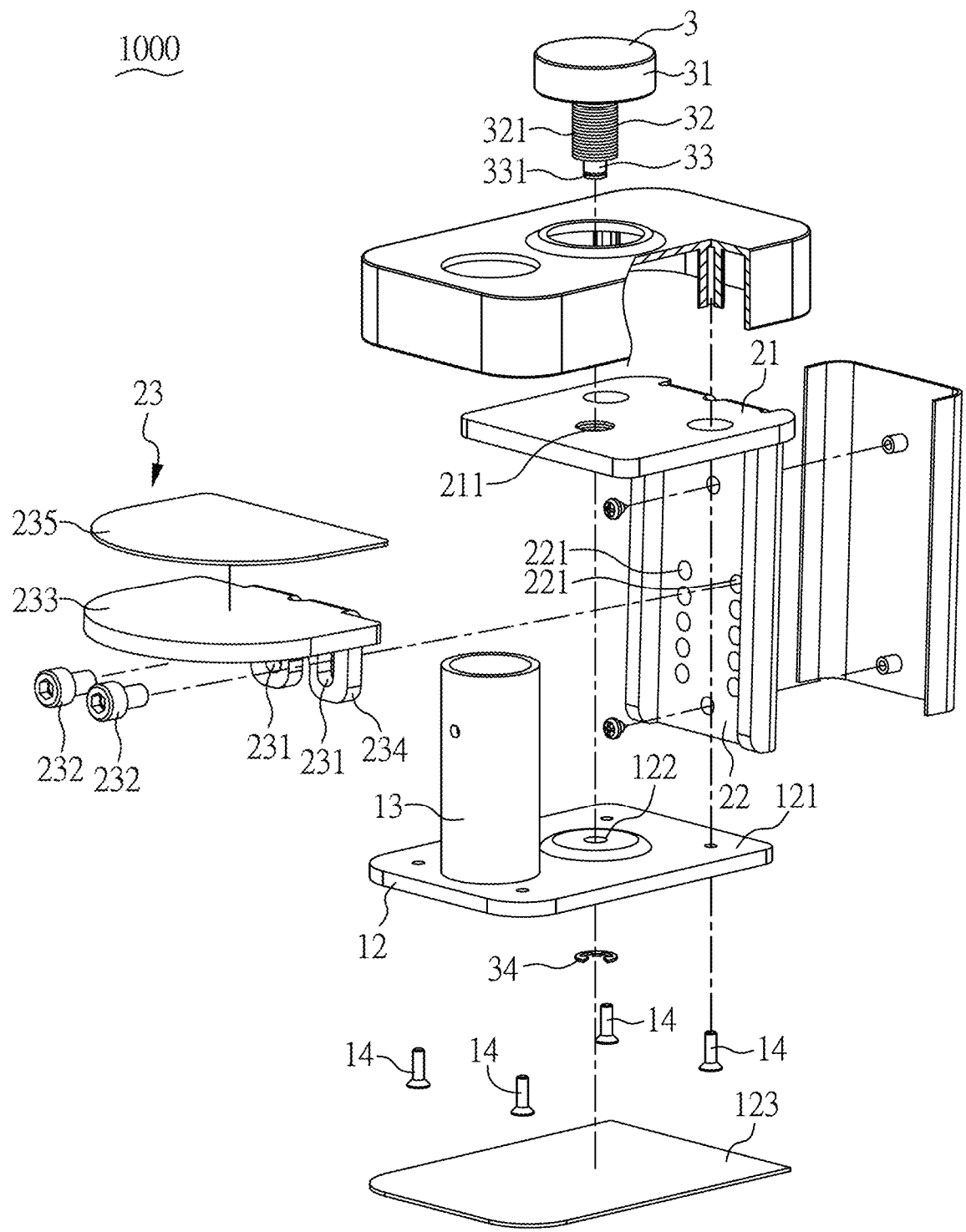
FIG. 3 is a perspective exploded view of the clamp according to the embodiment of the present invention.

Moreover, as shown in FIG. 3, the pressing plate 12 of the main body 1 further includes a first pad 123, and the clamping member 23 of the moving module 2 further includes a second pad 235. When the clamp 1000 clamps the board 2000, the first pad 123 and the second pad 235 contact with the board 2000 to enhance the clamping stability and to avoid damaging the surface of the board 2000.

Figure 7:
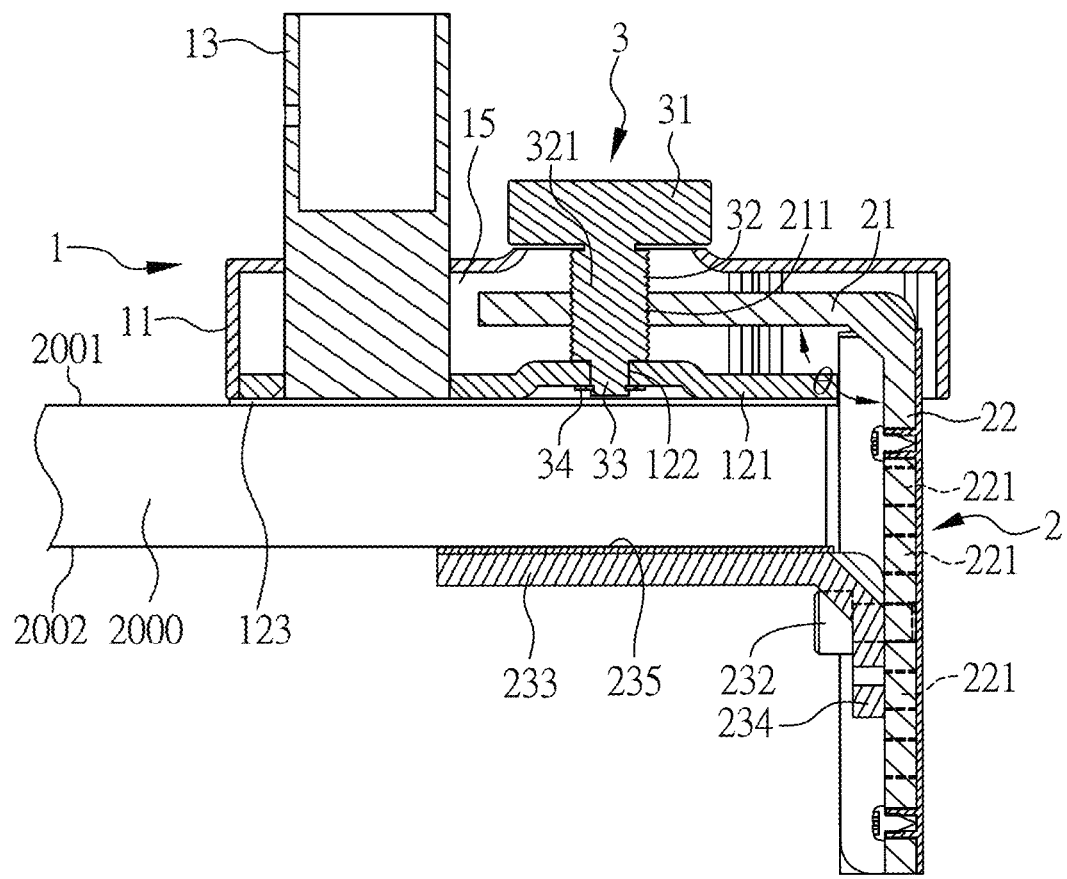
FIG. 7 is a cross-sectional view illustrating another movement of the clamp according to an embodiment of the present invention.

In addition, in order to further improve the clamping stability of the clamp 1000 on the board 2000, the moving module 2 may be designed with a compensation angle α in a preferred embodiment. As shown in FIG. 6, the second plate 22 is not exactly perpendicular to the first plate 21. When the first plate 21 is located at the lowest position, the angle θ between the first plate 21 and second plate 22 is slightly smaller than a right angle and is the complementary angle of the compensation angle α. With reference to FIG. 7, when the clamp 1000 is clamping on the board 2000, the first plate 21 and the second plate 22 are deformed under stress, and the angle θ between the first plate 21 and the second plate 22 is substantially 90 degrees. The deformation force generated by the deformed first plate 21 and the deformed second plate 22 provides further stability for the pressing plate 12 and the clamping member 23 clamping on the board 2000. The compensation angle α is 1 to 10 degrees, preferably 2 to 5 degrees.

In summary, compared to conventional clamps, the clamp of the present invention allocates the screw rod on top of the board to reduce safety risks, the screw rod may be rotated to move the moving module, and also be hidden within the housing and not to be exposed. The clamp is not only more aesthetical but also safer and more convenient to users.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. A clamp being configured with a supporting arm for supporting a display device, and being disposed on a board having an upper surface, the clamp comprising:
   a main body, including a housing and a pressing plate secured with each other and collaboratively defining a moving space, wherein the pressing plate has a shaft hole and detachably covers the upper surface;
   a moving module, including a first plate, a second plate and a clamping member, wherein the first plate includes a screw hole, is disposed in the moving space, and is parallel to the pressing plate, wherein the second plate is attached to the first plate and extends outwardly from the main body, wherein the clamping member is selectively secured to the second plate, and wherein the moving module further includes a compensation angle being from 1 to 10 degrees when the clamp is not clamping on the board; and
   a screw rod, rotatably and non-shiftably penetrating through the housing and the pressing plate, partially extending outwards the housing, and having threads to fasten to the screw hole of the first plate;
   wherein, when the screw rod rotates, the first plate moves between a highest position and a lowest position in the moving space, and simultaneously drives the second plate and the clamping member to move, such that a distance between the clamping member and the pressing plate is adjusted, and wherein an angle included by the first plate and the second plate when the first plate is at the lowest position and the clamp is not clamping on the board is a complementary angle of the compensation angle, and the angle between the first plate and the second plate is substantially 90 degrees when the clamp is clamping on the board.

2. The clamp of claim 1, wherein the distance between the clamping member and the pressing plate is defined as an initial distance when the first plate is at the lowest position, and the initial distance is adjusted by selectively locating the clamping member at different positions of the second plate, and wherein the initial distance is greater than a thickness of the board.

3. The clamp of claim 2, wherein a distance between the highest position and the lowest position is defined as a stroke, wherein a clamping distance is formed between the board and the clamping member when the first plate is at the lowest position and the board is between the pressing plate and the clamping member, and wherein the clamping distance is shorter than the stroke.

4. The clamp of claim 3, wherein the screw rod further includes a thinner rod body and a circlip, and the pressing plate further includes a main plate, wherein the circlip clips on the thinner rod body and is adjacent to the main plate, such that the thinner rod body is rotatably disposed in the shaft hole of the pressing plate.

5. The clamp of claim 3, wherein the pressing plate further includes a first pad and the clamping member further includes a second pad, wherein the first pad and the second pad contact with the board when the clamp is clamping on the board.

6. The clamp of claim 2, wherein the second plate includes at least one limiting hole, the clamping member includes a locking plate and at least one fixing member penetrating the locking plate to selectively connect to the at least one limiting hole, such that the clamping member is secured to the second plate.

7. The clamp of claim 6, wherein the clamping member further includes at least one through hole formed on the locking plate for the fixing member penetrating therethrough.

8. The clamp of claim 7, wherein the through hole of the clamping member is an elongated hole for adjusting the initial distance between the clamping member and the pressing plate when the fixing member is fastened in the through hole to adjust the position of the clamping member in relation to the second plate.

9. The clamp of claim 6, wherein the clamping member further includes an abutting plate, wherein the abutting plate and the locking plate are integrally formed and substantially have an L-shaped cross-section collectively.

10. The clamp of claim 1, wherein the main body further includes a supporting column being fixed to the pressing plate and extending through the housing for receiving the supporting arm.

* * * * *